(12) United States Patent
Gordon et al.

(10) Patent No.: US 10,289,527 B2
(45) Date of Patent: May 14, 2019

(54) TRACING OF EXCEPTION HANDLING EVENTS

(71) Applicant: ARM LIMITED, Cambridge (GB)

(72) Inventors: Richard Alan Gordon, Cambridge (GB); Thomas Sean Houlihane, Cambridge (GB)

(73) Assignee: ARM Limited, Cambridge (GB)

( * ) Notice: Subject to any disclaimer, the term of this patent is extended or adjusted under 35 U.S.C. 154(b) by 176 days.

(21) Appl. No.: 15/233,061

(22) Filed: Aug. 10, 2016

(65) Prior Publication Data

US 2017/0052869 A1 Feb. 23, 2017

(30) Foreign Application Priority Data

Aug. 17, 2015 (GB) .................................. 1514591.5

(51) Int. Cl.
*G06F 11/00* (2006.01)
*G06F 11/36* (2006.01)
*G06F 11/07* (2006.01)

(52) U.S. Cl.
CPC ........ *G06F 11/364* (2013.01); *G06F 11/0721* (2013.01); *G06F 11/0793* (2013.01); *G06F 11/3636* (2013.01)

(58) Field of Classification Search
CPC ............... G06F 11/3636; G06F 11/364; G06F 11/0793; G06F 11/0721
See application file for complete search history.

(56) References Cited

U.S. PATENT DOCUMENTS

| 8,775,875 B2* | 7/2014 | Isherwood | G06F 9/3836 714/45 |
| 9,606,850 B2* | 3/2017 | Horley | G06F 11/0721 |
| 2006/0095812 A1 | 5/2006 | Gerard et al. | |
| 2007/0011492 A1* | 1/2007 | Swaine | G06F 11/3636 714/35 |
| 2007/0180327 A1* | 8/2007 | Thekkath | G06F 11/3636 714/38.1 |
| 2008/0147946 A1* | 6/2008 | Pesavento | G06F 13/26 710/265 |

(Continued)

FOREIGN PATENT DOCUMENTS

| GB | 2459652 | 11/2009 |
| GB | 2511896 | 9/2014 |

OTHER PUBLICATIONS

CAFC, *Intellectual Ventures v. Capital One*, pp. 1-18 (Year: 2017).*

(Continued)

*Primary Examiner* — Marc Duncan
*Assistant Examiner* — Jonathan D Gibson
(74) *Attorney, Agent, or Firm* — Nixon & Vanderhye P.C.

(57) ABSTRACT

An apparatus comprises trace circuitry to output exception trace data indicating exception handling events detected during monitoring of processing activity of processing circuitry. A configuration element maintains exception trace configuration data for controlling the output of the exception trace data via the trace circuitry. When output of exception trace data is enabled, the trace circuitry selects, in dependence on the exception trace configuration data, how much of the exception trace data to output.

22 Claims, 8 Drawing Sheets

(56) References Cited

U.S. PATENT DOCUMENTS

2013/0205125 A1* 8/2013 Grocutt .................. G06F 21/52
                                                         712/244
2013/0311973 A1   11/2013 Rice et al.
2014/0237300 A1*  8/2014 Horley ................. G06F 11/348
                                                          714/45
2014/0281433 A1*  9/2014 Horley ................ G06F 11/0721
                                                         712/227
2015/0006869 A1*  1/2015 Ehrlich .............. G06F 11/3636
                                                         712/244

OTHER PUBLICATIONS

Extended European Search Report dated Dec. 2, 2016 in EP 16183816.4, 13 pages.
Combined Search and Exam Report for GB 1514591.5, dated Mar. 8, 2016, 6 pages.
European Office Action dated Oct. 12, 2018 in EP Application No. 16183816.4, 13 pages.

* cited by examiner

TRACING OF EXCEPTION HANDLING EVENTS

This application claims priority to GB Patent Application No. 1514591.5 filed 17 Aug. 2015, the entire contents of which is hereby incorporated by reference.

BACKGROUND

Technical Field

The present technique relates to the field of data processing. More particularly, it relates to tracing of exception handling events.

Technical Background

A data processing apparatus may include a trace module for tracing the processing activity of processing circuitry. For example the trace module may monitor which instructions are executed by the processing circuitry, the data addresses accessed by the processing circuitry, or the occurrence of certain events, and generate trace data providing information about the processing activity that has taken place. The trace data can be analysed to determine what happened during execution of a given program, which can help with diagnosing problems with the data processing apparatus or the program code being executed and with identifying possible solutions. Tracing can also be useful for performance profiling.

SUMMARY

At least some examples provide an apparatus comprising:
trace circuitry to output exception trace data indicative of exception handling events detected during monitoring of processing activity of processing circuitry; and
a configuration element to maintain exception trace configuration data for controlling the output of the exception trace data by the trace circuitry; wherein:
when output of the exception trace data is enabled, the trace circuitry is configured to select, in dependence on the exception trace configuration data, how much of the exception trace data to output.

At least some examples provide a method for monitoring processing activity of processing circuitry; the method comprising:
maintaining exception trace configuration data for controlling output of exception trace data indicative of exception handling events detected during monitoring of the processing activity of the processing circuitry; and
in dependence on the exception trace configuration data, selecting how much of the exception trace data to output when output of exception trace data is enabled.

At least some examples provide an apparatus comprising:
trace receiving circuitry to receive exception trace data indicative of exception handling events detected during monitoring of processing activity of processing circuitry; and
analysing circuitry to detect from the exception trace data which of a plurality of encoding formats is a current encoding format in which the exception trace data is encoded, and to decode the exception trace data according to said current encoding format.

At least some examples provide a method for analysing processing activity of processing circuitry comprising:
receiving exception trace data indicative of exception handling events detected during monitoring of processing activity of processing circuitry;
detecting from the exception trace data which of a plurality of encoding formats is a current encoding format in which the exception trace data is encoded; and
decoding the exception trace data according to said current encoding format.

A computer program may be provided to control a data processing apparatus to perform the method of analysing. The program may be stored on a computer-readable storage medium. The storage medium may be non-transitory.

Further aspects, features and advantages of the present technique will be apparent from the following description of examples, which is to be read in conjunction with the accompanying drawings.

DESCRIPTION OF EXAMPLES

Figure 1:
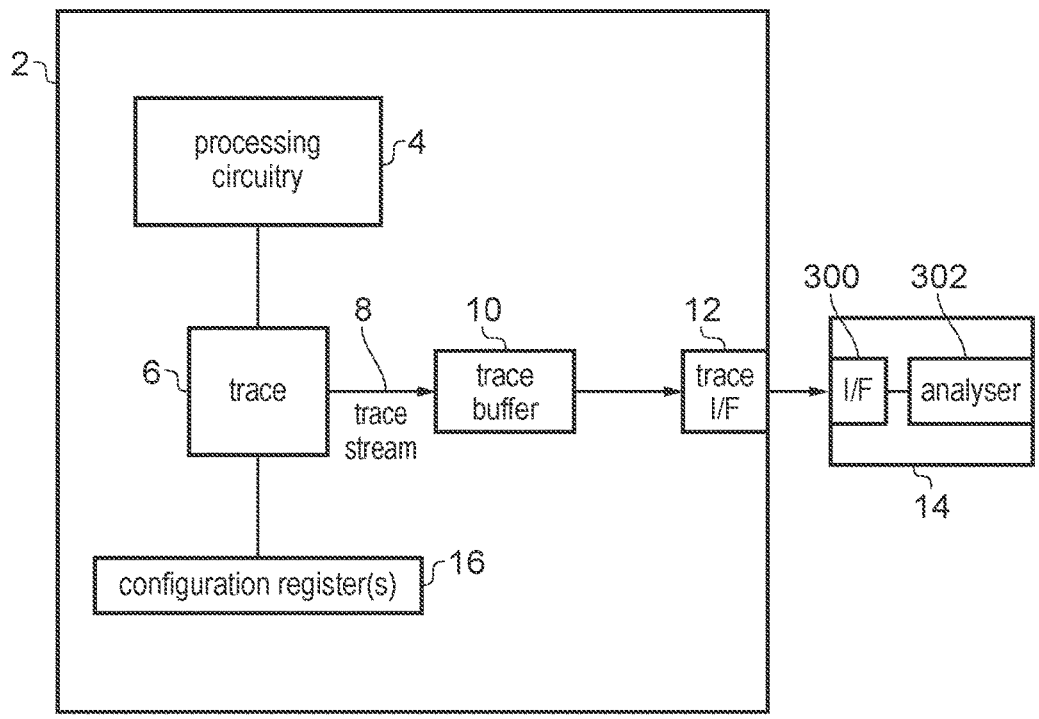
FIG. 1 schematically illustrates an example of a data processing apparatus having trace circuitry.

FIG. 1 schematically illustrates an example of a data processing apparatus 2 (e.g. a microprocessor). The apparatus 2 has processing circuitry 4 for performing data processing operations in response to program instructions. Any known processing circuit could be used as the processing circuitry 4. While FIG. 1 shows an apparatus with one processing circuit 4, it will be appreciated that some embodiments could have multiple processing circuits, and there could be many other elements provided which are not shown in FIG. 1 for conciseness.

An embedded trace module 6 is provided for monitoring the activity of the processing circuitry 4 when executing instructions. For example, the trace module 6 may snoop internal buses or wires within the processing circuitry 4 to monitor the activity of the processing circuitry. Based on the observed processing activity, the trace module 6 generates a trace stream 8 comprising a number of trace packets which include information about the processing activity of the processing circuitry 4. For example, the trace packets could indicate which instructions are executed by the processing circuitry 4, the addresses of data accessed by the processing circuitry 4, or the occurrence of certain events (e.g. exceptions, errors, mode changes, etc.), as well as the relative timings at which such activity takes place. The trace packets from the trace module 6 can provide visibility of the cycle-by-cycle instruction, data or control activity of the processing circuitry 4. The trace stream 8 is output to a trace buffer 10 which stores the trace packets on-chip. Trace packets can be read out from the trace buffer via a trace interface 12 by a trace analyser 14. The trace analyser 14 may store the read out packets and analyse the packets to determine information about the behaviour of the processing circuitry 4 when processing the program instructions. For example, the trace analyser 14 could be a dedicated trace analysis device, or a general purpose computer executing trace analysis software. The trace analyser 14 can interpret the trace packets and display information derived from the trace packets to a user, to help the user identify problems with the data processing apparatus 2 itself or with the software being executed by the processing circuitry 4, and find possible solutions.

While FIG. 1 shows a single trace module 6, in other examples there may be several trace modules. For example, a number of different trace modules could be provided to capture different kinds of information about the operation of the processing circuitry 4. For example, a first trace module may perform instruction trace to capture information about the timings of instructions executed by the processing circuitry, outcomes of branches, etc., while a separate data trace module may capture information about the data addresses accessed, say. Also, in systems comprising more than one processing circuit 4 there could be multiple trace modules provided to monitor the activity of different processing circuits 4. Hence, in some cases the trace buffer 10 or interface 12 may receive trace streams from a number of different trace sources and multiplex the trace streams for output to the trace analyser 14.

The apparatus 2 includes one or more configuration registers 16 for controlling the operation of the trace module 6. The configuration registers 16 may include configuration data which controls what information is included in the trace stream 8 generated by the trace module 6. This can allow the user of the system 2, 14 to control the trace module 6 to output only certain information that is of interest to the user, to avoid wasting bandwidth in the trace buffer 10 and trace interface 12 with information that is not needed. For example, the configuration register 16 could be updated by the processing circuitry 4 executing a configuration instruction to write configuration data to the configuration registers 16, or by providing an interface to allow the configuration registers to be written to from an external device such as the trace analyser 14 without requiring any instructions to be executed by the processing circuitry 4.

One example of an event which can be traced by the trace module 6 is an exception handling event, which may be any event relating to the handling of exceptions by the processing circuitry 4. An exception is a request that the processing circuitry 4 interrupts its current processing and carries out another processing routine. There may be a number of types of exception and each type of exception may have a corresponding exception handling routine which defines a number of instructions to be executed when the exception is taken. Exceptions can include hardware interrupts, e.g. where a hardware signal is received to indicate that some event has occurred, or software exceptions triggered by execution of certain kinds of instruction or in response to a certain condition arising during program execution. For example, exceptions can be used to indicate faults or errors (e.g. a memory protection violation or a bus fault), the occurrence of an external event (e.g. the user pressing a button on the apparatus 2, or receipt of a signal from an external device), or any other event which may be defined by the software executing on the processing circuitry 4. References to "exceptions" below should be interpreted as including interrupts.

Each type of exception may be identified by a corresponding identifier (or "exception number") and may have an associated priority level. When an exception occurs, an exception controller may determine whether the priority of the exception is greater than the priority of the processing currently being performed. If the priority of the incoming exception is the same as, or lower than, the priority of the current processing, then the exception is not taken until the current processing is complete. However, if the exception has a greater priority than the current processing, then the exception is taken and the current processing is interrupted. To allow the current processing to be resumed later once the exception has finished, a state saving operation may be performed to save at least some processor state associated with the current processing to another location (e.g. a stack data structure in memory). For example the saved processor state may include the contents of at least some registers of the processing circuitry 4, the current value of the program counter, condition flags or other state information representing the current state of the processor, and any other information which may be required to resume the current processing at a later time. The state saving could be performed in hardware by an exception controller, in software by the current process executing at the time the exception occurred and/or the exception handling routine executed in response to the exception, or by a combination of hardware and software. Having performed the state saving, the exception handling routine is executed to perform any tasks required for handling the event signalled by the exception. The exception handling routine could itself be interrupted if an exception of even higher priority occurs. Once the exception handling routine is complete then the previously saved state may be restored (again, using hardware, software or a combination of hardware and software) and then the previous processing continues as if the exception never occurred.

The trace module 6 may detect the occurrence of various exception handling events relating to the handling of each exception. For example, the exception handling events may include:

an exception entry event when the processing circuitry 4 enters an exception handling routine corresponding to a given exception;

an exception exit event when the processing circuitry 4 completes or leaves an exception handling routine corresponding to a given exception; and an exception return event when the processing circuitry 4 returns to processing a given exception following occurrence of another exception.

Optionally, some systems could also trace an exception signalling event representing the timing at which an exception is first signalled (separate from the timing at which the processing circuitry 4 actually enters the corresponding exception handling routine).

Figure 2:
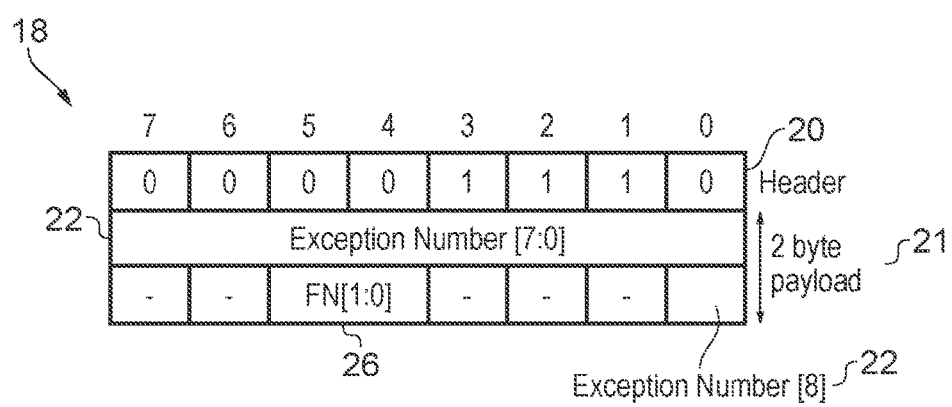
FIG. 2 illustrates a first example of an exception trace packet for providing information about exception handling events.

FIG. 2 shows an example of an exception trace packet 18 for providing information about exception handling events. The packet 18 comprises a header 20 and a payload 21. The first byte of the packet 18 represents the header 20 which indicates what information is included within the trace packet. Bits [1:0] of the header 20 represent the size of the subsequent payload 21 of the trace packet, and have the following encoding:

- 0b01: 1-byte payload (i.e. the packet size is 2 bytes including the header 20)
- 0b10: 2-byte payload (i.e. 3-byte packet including the header 20)
- 0b11: 3-byte payload (i.e. 4-byte packet including the header 20).

Hence, the example of FIG. 2 is a 3-byte packet as indicated by bits [1:0] of the header being 0b10. The remaining bits [7:2] of the header 20 indicate the type of trace information provided in the payload 21. In this example, the value 0b000011 indicates that this packet is an exception trace packet providing information on exception handling events. All the examples of exception trace packets 18 described in the present application have the same value for bits [7:2] of the header, but it will be appreciated that in other examples there could be several different types of exception trace packet which are distinguished by different header values.

The payload 21 includes an exception number 22 which identifies the type of exception to which the corresponding exception handling event relates. In this example, the exception number 22 comprises 9 bits, with bits [7:0] being encoded in the first byte of the payload 21 and bit [8] being encoded in the least significant of the second byte of the payload 21. Some examples of types of exception that could be identified include the following: Reset, Hardware fault, Memory Management fault, Bus fault, Debug exception, Timer exception (triggered by the expiry of a certain timer), various External Interrupts, as well as certain software-defined exceptions. In some cases the normal processing being performed by the processing circuitry 4 before any exceptions occurred may also be allocated a corresponding exception number (e.g. exception number 0) to allow an exception trace packet to signal when processing returns to the normal processing once any outstanding exceptions have been handled.

The payload 21 also includes a function number 26 (or exception handling event type identifier) which identifies what type of exception handling event has occurred in relation to the exception type indicated by the exception number 22. For example, the function number 26 can be encoded in bits [5:4] of the second byte of the payload 21. The encoding of the function number 26 field could for example be as follows:

- 0b01: exception entry (the processing circuitry 4 entered the exception handling routine for the exception type indicated in the exception number field 22)
- 0b10: exception exit (the processing circuitry 4 exited the exception handling routine for the exception type indicated in the exception number field 22)
- 0b11: exception return (the processing circuitry 4 returned to processing of the type indicated in the exception number field 22, which could be another exception or normal processing as mentioned above)
- 0b00: Reserved.

The other bits of the exception trace packet are reserved, so would not be interpreted by the trace analyser 14. In some cases the trace module 6 could fix all reserved bits to 0.

Each trace packet 18 generated by the trace module 6 may also have an associated time stamp which indicates the time at which the exception handling event occurred (relative to some reference clock or to other events being traced). In some embodiments, the time stamp could be included in the exception trace packet itself. Alternatively, a separate timing trace stream could be generated comprising time stamps which allow the timing of each trace packet in related trace streams to be correlated.

Figure 3:
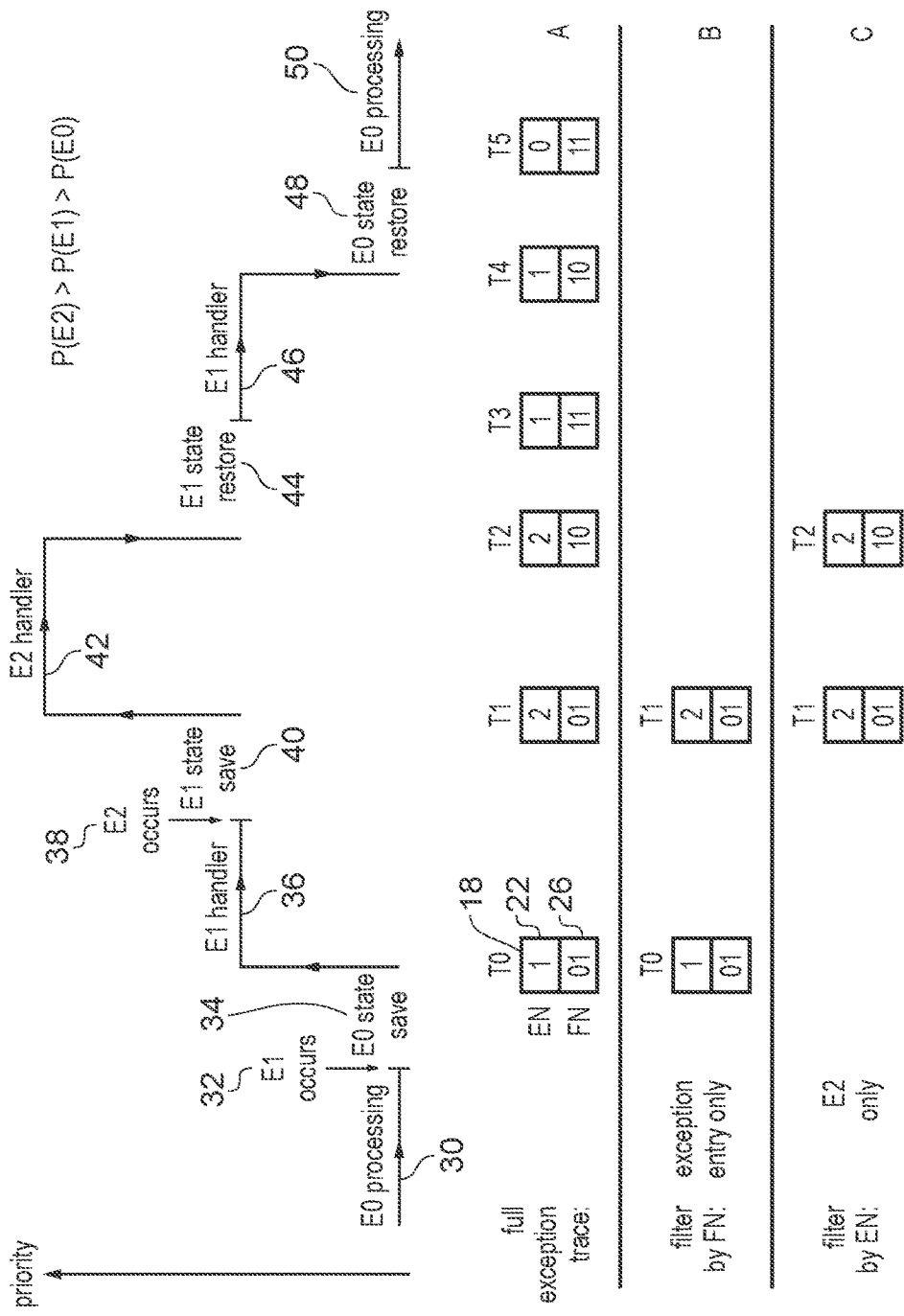
FIG. 3 shows an example of filtering which exception trace packets are output by the trace circuitry.

FIG. 3 shows an example of a series of exceptions handled by the processing circuitry 4 and corresponding exception trace packets 18 generated to indicate the corresponding exception handling events. In this example three exceptions are shown with exception E2 having the highest priority, exception E1 having a lower priority than E2 and exception E0 having the lowest priority.

At step 30 of FIG. 3, the processing circuitry 4 is initially performing processing associated with exception E0. This could be the normal processing of a program without any preceding exception having occurred, or could be an exception handling routine associated with some earlier exception. At step 32, exception E1 is signalled, which has a higher priority than exception E0. At step 34 a state saving operation is performed to save at least part of the processor state to a stack or other storage structure. At step 36, the processing circuitry 4 starts executing the exception handler associated with exception E1. At step 38, another exception E2 occurs which has a higher priority than exception E1, and so the handler for E1 is interrupted and another state saving operation is performed at step 40 to save at least some of the processor state resulting from processing of exception E1. At step 42, another exception handling routine associated with exception E2 is executed. The E2 exception handler completes without interruption, and so at step 44 a state restoration operation is performed to restore the state associated with exception E1, before resuming the exception handling routine for exception E1 at step 46. When the exception handler for E1 is completed, another state restoration operation is performed to restore the E0 processing state at step 48, and then the original processing of E0 continues at step 50.

Part A of FIG. 3 shows an example of the trace packets 18 which may be generated in response to the exception handling events shown in FIG. 3:

- time T0: exception number (EN)=1, function number (FN)=0b01—indicating exception entry to E1.
- T1: EN=2, FN=0b01—exception entry to E2.
- T2: EN=2, FN=0b10—exception exit from E2.
- T3: EN=1, FN=0b11—exception return to E1.
- T4: EN=1, FN=0b10—exception exit from E1.
- T5: EN=0, FN=0b11—exception return to E0.

Hence, multiple exception trace packets may be generated for each exception. As exception handling events may occur relatively frequently, and the size of an exception trace packet may be relatively large compared to the size of the trace buffer 10 (e.g. 3 bytes as shown in FIG. 2 compared to a typical trace buffer which might only have capacity for 16 bytes of trace data say), the tracing of exception handling events can lead to the generation of a large amount of trace data which can cause the trace buffer 10 to become full. The trace interface 12 for outputting data to the trace analyser 14 may have a relatively narrow bandwidth (e.g. it could even be a single wire output capable of outputting only 1 bit per cycle). Therefore, it can take many cycles to read out all the data from the trace buffer 10. If the trace module 6 generates trace data at a greater rate than the trace interface 12 can remove them from the trace buffer 10, then the buffer 10 may soon overflow so that some trace packets have to be discarded without being output to the trace analyser 14. This leads to loss of information about the activity of the processing circuitry 4, which can make it hard to perform any meaningful analysis of the processing activity. An option would be to disable exception tracing altogether, but then no information is provided about the occurrence of exceptions which can often provide useful insight into possible reasons for loss of performance when executing a given program.

To address these issues, while tracing of exception events is enabled, the trace module 6 can vary how much exception trace information is output in the trace stream 8, based on exception trace configuration data set in the configuration register 16. Hence, depending on what particular aspects of exception handling are of interest to the developer, the developer can set exception trace configuration data in the configuration register 16 to control the amount of exception trace information that is generated. If the user still requires the full exception trace functionality as discussed above, then this can still be provided. However, if the user wishes to reduce the amount of exception trace data then the configuration information can be set in the register 16 to select one of a number of options as discussed below. The exception trace configuration data controls only the amount of exception trace information generated, not other types of trace information. By selectively reducing the amount of trace data generated concerning exception handling events, this not only can improve the tracing of the exception handling events themselves by allowing the user to focus on the type of information that is useful to them, but this also improves the tracing of other kinds of processing activity, because information relating to non-exception-related events is less likely to be discarded from the trace buffer 10 due to the large amount of exception trace information. Hence, this allows a more meaningful analysis of the processing activity of the processing circuitry 4 as a whole, not just when analysing exception events.

There are a range of different techniques which can be used by the trace module 6 to vary the amount of exception trace information that is generated. Some examples will now be described.

In some embodiments, the trace module 6 may filter which trace packets are output in the trace stream 8 based on the type of exception handling event, as identified by the function number 26. For example, the configuration register 16 may include information defining a certain subset of types of exception handling events that should be traced, and the trace module 6 may suppress the output of trace packets relating to types of exception handling event other than the selected subset.

For example, as shown in part B of FIG. 3, only the exception packets relating to exception entry could be output, but packets relating to exception exit or return could be suppressed. This could be useful for example if the user only wishes to find out the relative frequency at which exceptions occur, but is not concerned with how long the processor spends processing an exception once it has entered the exception handling routine. Also, tracing only exception entry packets provides a record of which exception handlers were called, in what order, and in what proportion, which can provide the majority of the exception-related information of interest. By tracing only exception entry and suppressing the output of packets for exit and return events, the amount of exception trace data can be reduced by around a third and this greatly alleviates the pressure on the trace buffer 10 and trace interface 12 to make buffer overflow less likely.

The configuration information in register 16 setting which types of exception handling event to trace could be encoded in different ways. In some examples, some control bits of register 16 could be individually enable or disable tracing of each type of exception handling event. e.g.:

| Control bits [2:0] | Entry | Exit | Return | Summary |
|---|---|---|---|---|
| 0b000 | Disabled | Disabled | Disabled | All disabled |
| 0b001 | Enabled | Disabled | Disabled | Entry only |
| 0b010 | Disabled | Enabled | Disabled | Exit only |
| 0b011 | Enabled | Enabled | Disabled | Entry and Exit |
| 0b100 | Enabled | Enabled | Enabled | All enabled |
| 0b101 | Disabled | Enabled | Enabled | Exit and Return |
| 0b110 | Enabled | Disabled | Enabled | Entry and Return |
| 0b111 | Disabled | Disabled | Enabled | Return only |

Note that in this example, the same control bits for individually enabling/disabling each type of exception handling event can also be used to enable/disable exception tracing as a whole.

Alternatively, a separate exception trace enable bit could be provided to enable/disable exception tracing as a whole (this might improve compatibility with legacy trace analysers which may expect an enable/disable bit to be provided). Some further configuration bits may then specify which subset of exception handling event types is to be traced. For example:

| Control bits [3:0] | Entry | Exit | Return | Summary |
|---|---|---|---|---|
| 0b0xxx | Disabled | Disabled | Disabled | All disabled |
| 0b1000 | Enabled | Enabled | Enabled | All enabled |
| 0b1xx1 | Disabled | Enabled | Enabled | Exit and Return only |
| 0b1x1x | Enabled | Disabled | Enabled | Entry and Return only |
| 0b11xx | Enabled | Enabled | Disabled | Entry and Exit only |
| 0b1111 | Reserved | Reserved | Reserved | Reserved |

Hence, in this example bit [3] is the enable/disable bit for enabling or disabling tracing as a whole, while bits [2:0] are set to 1 to disable tracing of return, exit or entry respectively. Note that it is not necessary to support all possible combinations of enabling/disabling the individual exception handling event types. Some systems may only support selection of certain combinations of exception handling event types which are to be traced.

It will be appreciated that these are just two examples, and many other techniques may be used to select which types of exception handling event are to be traced.

Similarly, the configuration information in the configuration registers 16 may identify a subset of exception types to be traced, and the trace module 6 may suppress output of any exception trace packets relating to an exception type which is not in the selected subset. Hence, filtering exception trace packets by exception number may be implemented. For example, as shown in part C of FIG. 3, the configuration register 16 could be set so that only exception trace packets relating to exception E2 are output and the packets relating to exceptions E0, E1 are suppressed.

In some cases, the selection of which exception numbers are to be traced could be relatively coarse-grained. For example, a single bit could be set to a first value indicating that all exception types should be traced or a second value indicating that a certain predetermined subset of the exception types should be traced. For example, the bit could indicate whether hardware exceptions only, or both hardware and software exceptions should be traced.

Alternatively, the configuration register 16 could support more fine grained control where different subsets of exception types could be selected. For example, a number of control bits of register 16 could be provided with different encodings of these control bits corresponding to a different predetermined subsets of exception types to be traced. At the most fine-grained level, tracing of each type of exception could individually be enabled or disabled using a corresponding control bit. In another example, the register 16 may include information defining a range of exception numbers for which exception trace packets 18 should be output in the trace stream 8 (e.g. exception numbers in the range 0 to 16 or 0 to 31 for example). This approach could be relatively efficient to implement in hardware because often the trace module 6 may already have comparators for comparing values detected during the operation of the processing circuitry 4 against control parameters defining whether trace data should be generated in response to those values. For example, data watchpoints may be set up to trigger output of a trace packet when the processing circuitry 4 issues a memory transaction specifying an address within a certain range of addresses. The comparators already provided for other types of comparison could be reused to compare whether the exception number of a given exception falls within the range of exception numbers to be traced as defined in the configuration register 16. Regardless of how the configuration register 16 indicates the subset of exception types for which trace packets are to be output, the trace module 6 may suppress output of trace packets for any types of exception not in the selected subset.

As well as (or instead of) filtering trace packets so that whole packets are selectively output or suppressed, the trace module 6 may also vary what information is included within an exception trace packet 18, based on the exception trace configuration information set in the configuration register 16. Several examples of this are discussed below.

Figure 4:
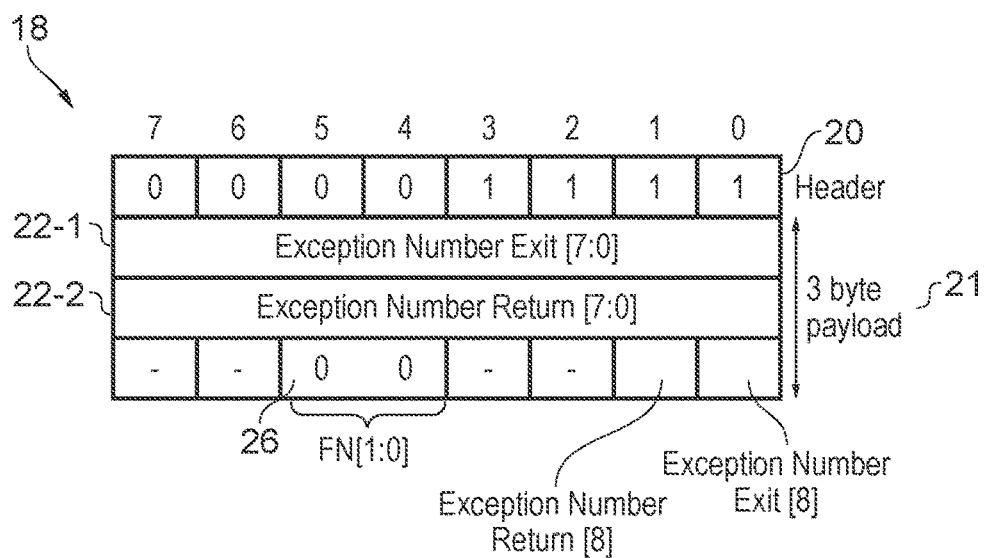
FIG. 4 shows a second example of an exception trace packet in which information concerning exception exit and return events are merged in one packet.

FIG. 4 shows an example in which the trace module 6 can selectively merge exception trace packets for two different exception handling events depending on the exception trace configuration information. For example, FIG. 4 shows a merged trace packet format for merging the exception trace packets relating to exception exit and exception return. Instead of outputting two 3-byte packets as shown in FIG. 2 to separately indicate the timing of exception exit and exception return, FIG. 4 shows a single 4-byte packet which includes both the exception number 22-1 of the exception from which the handler was exited and also the exception number 22-2 of the exception to which processing returns after exiting the handler. As there are now two exception numbers 22-1, 22-2, bit [1] of the final byte of the payload is used to encode bit [8] of the second exception number 22-2. As the packet has a 3-byte payload, bits [1:0] of the header portion 20 take the value 0b11 as indicated above. Also, the reserved value 0b00 of the function number 26 indicated above could be allocated for indicating that this is a packet relating to both exception exit and return rather than any of the individual exception handling events explained above.

While merging the exit and return packets would lead to some loss of information since the timings of the individual exit and return events can no longer be determined (which could be especially relevant in the tailchaining case described below), this may be acceptable for some users and so by providing configuration in the configuration register 16 to select whether exit and return are traced using separate packets or a single merged packet, the user can select the option required for their particular application. When merging of the exit and return packets is considered suitable, this can save 2 bytes of trace data per exit/return pair since a single 4-byte packet is output instead of two 3-byte packets. If timestamping of trace packets is enabled, the merging of exception trace packets also saves bandwidth by reducing the amount of timestamp data output.

To support such merging of packets, the trace module 6 could have a register or buffer for temporarily holding the exception number of the exception from which the handler was exited for a time until the corresponding exception return is detected when a combined exit/return packet can be output.

While FIG. 4 shows an example of merging packets relating to exception exit and return, in other embodiments the trace packets relating to other types of exception handling event could be merged with the function number 26 indicating which types of exception handling event are indicated (additional bits could be allocated to the function number 26 if necessary) and a series of two or more exception numbers indicating the types of exceptions relating to each event.

Figure 5:
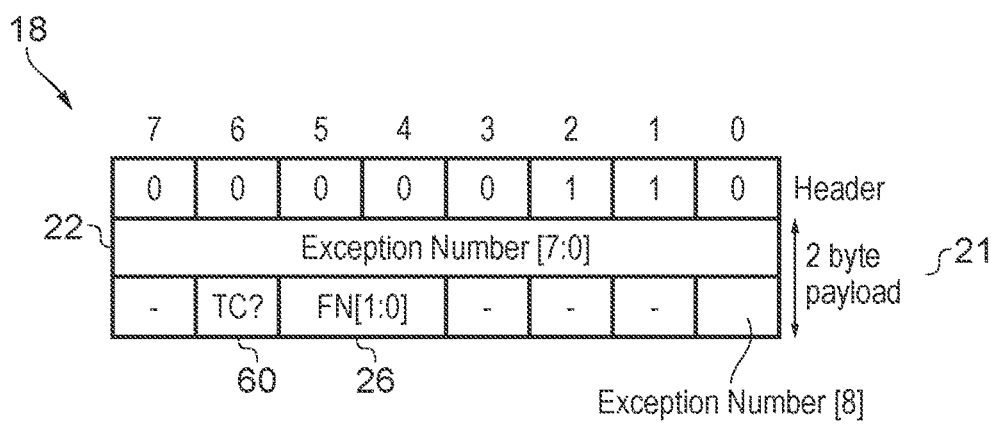
FIG. 5 shows a third example of an exception trace packet comprising a tailchain flag.

FIG. 5 shows another example of a trace packet 18 which includes a tailchaining flag 60 (tailchain identifying value) for indicating whether there are tailchained exceptions. Otherwise the packet 18 is the same as in FIG. 2. The concept of tail chaining is described with respect to FIG. 6.

Figure 6:
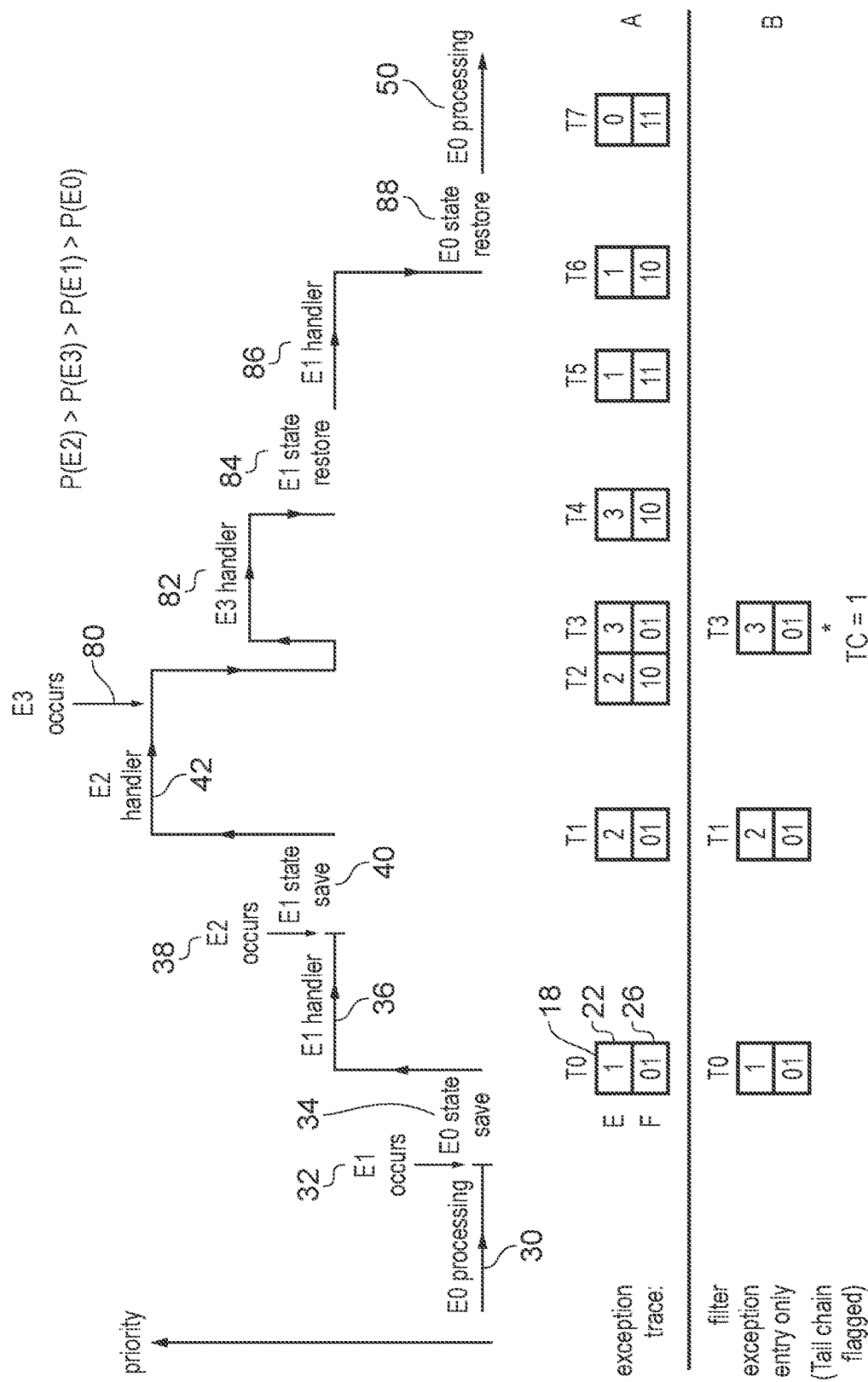
FIG. 6 shows an example of tailchaining exceptions.

FIG. 6 shows a similar series of exceptions to FIG. 3, including three exceptions E0, E1, E2 with successively higher priority as in FIG. 3. Steps 30 to 42 of FIG. 6 are the same as in FIG. 3. In FIG. 6, however, while processing the handler routine for exception E2, another exception E3 occurs at step 80. Exception E3 has a lower priority than exception E2 and a higher priority than exception E1. As exception E3 has a lower priority than E2, E3 does not interrupt the exception handler for E2. When the E2 exception handler completes, the exception controller determines that exception E3 has a higher priority than exception E1 which was being processed before E2 occurred, and so E3 should be processed before returning to E1. Therefore, processing switches direct to the exception handler associated with exception E3 without first restoring the processor state associated with exception E1. By switching straight from the end of the E2 handler to the beginning of the E3 handler without performing any intervening state restoration for restoring the state associated with the processing E1 being performed before exception E2, exception E3 can be handled more quickly to reduce interrupt handling latency. This is known as tailchaining of exceptions. At step 82 the E3 exception handler is executed, and when it finishes then at step 84 the state associated with exception E1 is restored, and then steps 86 to 90 of FIG. 6 are the same as steps 46 to 50 in FIG. 3.

Sometimes the user performing the trace analysis may wish to find out whether two exceptions were tailchained or not. If full exception tracing of exception entry, exit and return event is enabled, then the exception handling event shown in FIG. 6 would lead to a series of trace packets as shown in part A of FIG. 6. The fact that exception E3 was tail chained after exception E2 can be seen from the trace stream because the trace packets marking exception entry to E3 at time T3 and exception exit from E3 at time T4 occur between the exception exit packet for exception E2 at time T2 and the exception return packet for exception E1 at time T5. In contrast, if exception E3 occurred after the E1 state had been restored and so was not tailchained after exception E2, the exception entry packet for exception E3 would have occurred after the exception return packet for E1 in the trace stream.

However, as discussed above, to reduce the amount of trace data, the user may configure the configuration register 16 to control the trace module 6 to filter the trace packets, e.g. to only output exception trace packets for exception entry events, not exception exit or return. In this case, it may not be possible to detect the tailchaining case solely from the exception entry packets. For example, as shown in part B of FIG. 6 the exception entry packets at times T0, T1, T3 would not permit a user to determine whether the exception entry for exception E3 at time T3 occurred after processing had returned to the E1 exception handler or was tailchained directly after finishing the exception handler for exception E2.

By providing a tailchain flag 60 in the exception packet 18 as shown in FIG. 5, tailchaining can be indicated without needing to output all the packets relating to exception entry, exit and return. For example, as shown in part B of FIG. 6, the exception entry packet for exception E3 could have the tailchain flag 60 (TC) set to 1 to indicate that exception E3 was tailchained after exception E2. This means that even when there is filtering of trace packets, the tailchain case can still be indicated, which makes it more practical to use exception trace packet filtering without losing information about tail chaining. Hence, while providing a tailchain bit 60 in the trace packet may not appear to help with reducing the amount of trace data generated, it makes use of exception trace packet filtering more feasible without losing information about tail-chaining, and so in practice it allows filtering by exception handling event type to be used more often. This can greatly help to reduce the amount of exception trace information generated, reducing the stress on the trace buffer and trace interface, reducing the likelihood of trace information being lost, and hence improving the usefulness of the trace data that is output.

In this example, the tailchain flag 60 is encoded in bit [6] of the second payload byte, and may be set to 1 when two exceptions are tailchained, and set to 0 if there is no tailchaining. It will be appreciated that the opposite mapping could also be used (with 0 indicating tailchaining and 1 indicating no tailchaining). The tailchain flag 60 could also be encoded in other bits of the packet—bit [6] of the second byte is just an example. Another option for encoding the tailchain flag 60 could be to use the reserved value 0b00 of the function number field 26 to indicate that there is tailchained exception entry for example.

Also, FIG. 6 shows an example of setting the tailchain flag 60 for an exception entry trace packet when it is detected that the exception handler for the new exception has been entered following completion of a previous exception without an intervening state restoration to restore state associated with processing being performed before the previous exception. However, it would also be possible to set the tailchain flag 60 for an exception exit trace packet when it is detected that a following exception will be taken following the exit from the current exception without intervening state restoration for restoring state associated with the processing performed before the exited exception was taken.

In general, the configuration register 16 may include at least one configuration bit which controls whether the trace module 6 should set the tailchain flag 60 when tailchaining is detected. Selectively turning off the tailchain flagging functionality can be useful for supporting legacy trace analysis devices 14 or trace analysis software which may not be able to interpret the tailchain flag 60, but when the trace analyser does support the tailchain flag 60 then activating this feature using the configuration register 16 can help to improve the information derived from the trace stream even when some trace packets are filtered, to reduce the amount of data generated.

In other examples, the tailchain case could be indicated instead by merging of exception exit and return packets in the same way as shown in FIG. 4. However, an advantage of providing an explicit tailchain flag 60 as in FIG. 5 is that in real world trace scenarios some trace packets may sometimes be dropped from the trace stream (e.g. due to the trace buffer 10 overflowing), and so adding an explicit tailchain flag increases confidence that an exit-entry sequence is actually a tailchained exception entry, and not just an exit-return-entry case with such tight timing that the return data is discarded due to buffer overflow.

Figure 7:
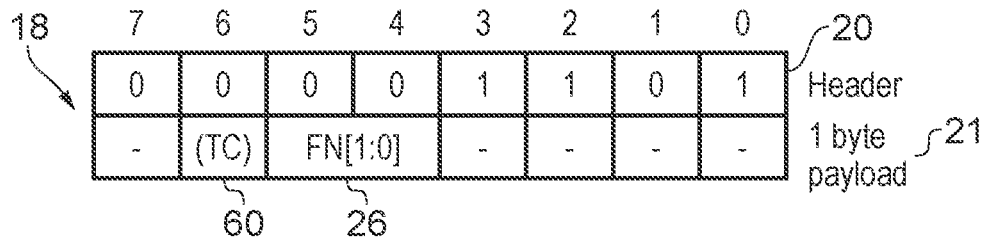
FIG. 7 shows a fourth example of an exception trace packet in which an exception number identifying the type of exception is omitted.

FIG. 7 shows another example for reducing the amount of information included in a trace packet by omitting the exception number 22 from the exception trace packet 18 altogether. In this example, the exception trace packet 18 has a 1-byte payload 21 and so the size bits [1:0] of the header 20 are set to 0b01. The payload 21 in this example specifies the function number 26 and (optionally) the tailchain flag 60. It may seem counterintuitive to omit the exception number altogether since on the face of it this would seem to be the most important piece of information generated in the exception tracing. However, it is recognised that sometimes a user performing trace analysis may not be interested in which particular exceptions have occurred, but may simply wish to determine the timings or the relative frequency at which exceptions occur. Hence, by providing bits in the configuration register 16 which control whether the trace module 6 includes the exception number 22 in the exception trace packets 18, the user can reduce the amount of trace data generated when exception types are not of interest, again alleviating the pressure on the trace buffer 10 and interface 12.

Figure 8:
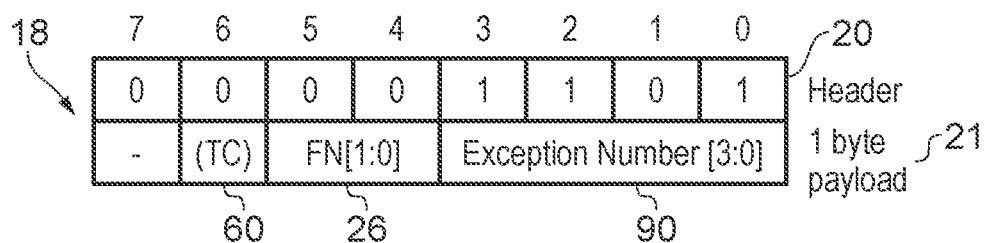
FIG. 8 shows a fifth example of an exception trace packet comprising a smaller exception number field than the example of FIG. 2.

FIG. 8 shows another example in which the number of bits allocated for encoding the exception number can be varied depending on configuration information in the configuration register 16. The examples discussed above encode a 9-bit exception number, so that 512 different types of exceptions could be indicated. However, some of these exceptions could be rare, or the user may only be interested in a certain subset of the exception types, so often a smaller exception number field may be enough to indicate most types of exceptions the user is interested in. For example, in some versions of the ARM® architecture exception numbers 0 to 15 may correspond to the hardware interrupts defined in the architecture (representing interrupts such as Reset, various Faults or errors, Timer interrupts, etc.), while exception numbers 16 and above may correspond to external interrupts or software exceptions which are specific to a particular implementation. Hence, exceptions with exception numbers 0 to 15 could be encoded more efficiently using a 4-bit exception number field 90 as shown in FIG. 8, which allows both the exception number 90 and the function number 26 to fit within a 1-byte payload 21, to reduce the size of the trace packets. Exceptions with exception numbers of 16 or higher may still be traced using the normal trace packet of the form shown in FIG. 2. Alternatively, when tracing with a reduced size exception number field 90 is selected, then tracing of the exception numbers 16 and above could be suppressed completely. Hence, the reduced exception number field 90 shown in FIG. 8 can be particularly useful when combined with filtering the exception trace packets by exception number as discussed above. In general, the configuration register 16 may include configuration information which controls whether the trace module 6 generates packets with the full size exception number field 22 or a reduced size exception number field 90 for exceptions whose exception number fits within the reduced size field 90, and optionally further configuration information for controlling whether the trace module 6 should output any trace packets for exceptions whose exception number does not fit within the reduced size field 90.

Another way of providing a reduced exception number 90 may be to encode exception numbers within a certain range of values using the reduced exception number field 90, by representing the exception number as an offset from a defined base value. For example, if the reference value is 80, exception number 86 may be encoded as an offset of 6. Exception numbers whose offset from the base value is larger than can be represented in the reduced exception number field 90 may use the full encoding of the exception number as in FIG. 2. A range comparator may be provided in the trace module 6 for detecting whether the exception number is in the range that can be represented in the reduced exception number field 90. The base value could be specified by the configuration register 16. In some cases, the other upper limit of the range of exception numbers for which the reduced field 90 is used could also be specified, or it could be implicit from the size of the reduced exception number field 90 (e.g. a 4-bit field could indicate offsets 0 to 15 from the base value). The configuration register 16 may also specify whether the offset-based encoding of the exception number is enabled or disabled.

The trace circuitry could also support a compression mode for compressing the amount of exception trace data generated without losing information. It may be relatively common that two successive exception trace packets specify the same exception number. For example, as shown in FIG. 3, at times T1 and T2 two successive packets were generated for exception entry and exit for exception number E2. Similarly, in FIG. 6 at times T5 and T6 there were two successive packets specifying the same exception number. Therefore, when in the compression mode, the trace module 6 could omit the exception number 22 from the payload 21 of the exception trace packet 18 when the exception number is the same as the most recently output packet. A comparator may be provided in the trace module 6 for comparing the exception number of the current event against the most recent exception number, and suppressing output of the exception number when these are the same. For example the packet format shown in FIG. 7 could be used when the exception number is omitted. When the trace analyser 14 receives a packet without an exception number 22, it can assume that the exception number 22 is the same as the preceding packet that did have an exception number. Enabling and disabling of the compression mode can be selected using the configuration information set in the configuration register 16.

Matching against the immediately preceding exception number may provide some compression, but it may be limited to certain situations, such as the exception entry and exit of the exception having the highest level of priority within a nested set of exceptions, or the exception return to a given exception followed by exit from that exception when there is no intervening exception event. For many exceptions, however, the exception entry and exit packets for a given exception could be separated by trace packets with a different exception number because the given exception was itself interrupted (e.g. see exception E1 in FIG. 3).

To improve the amount of compression achieved, a storage structure can be maintained by the trace module to track a number of recently encountered exception numbers, and if the current exception number matches any of these recent exception numbers, then the exception number could be omitted from the current trace packet.

For example, the trace module may maintain a small stack of previous exception number values. On an exception entry, the exception number of the incoming exception may be pushed onto the stack. On an exception exit, the exception number at the top of the stack can be compared against the current exception number, and if they are the same the exception number can be omitted from the current exception trace packet, and the matching exception number can then be popped from the stack. This exploits the fact that when there is nesting of exceptions, a series of exceptions of successively higher priority may be entered and then exited in the reverse order in which they were entered. Hence, a stack structure which effectively provides a last-in-first-out storage structure can be very useful for unrolling the exception numbers in the reverse order from which they were encountered. Similarly, if a given process keeps being interrupted by higher priority exceptions, then each return to that same process could lead to a packet with the same exception number and the stack may allow some of these return packets to omit the exception number.

An example is shown below:
exception return to E0 (full packet, push 0 to stack)
exception entry to E1 (full packet, push 1 to stack)
exception exit from E1 (reduced packet omitting exception number, as matched previous number at top of stack, pop 1 off stack)
exception return to E0 (reduced packet omitting exception number, as matched previous number at top of stack, pop 0 off stack).

The trace analyser 14 may maintain a corresponding stack data structure for determining the exception numbers for each packet. The stack data structure could be maintained in hardware or by using software to maintain a similar data structure. When a packet is received which specifies an exception number 22, the exception number can be pushed to the stack. When a packet is received which does not specify an exception number, the exception number at the top of the stack is popped and allocated to that packet. In this way, the amount of trace data can be reduced when the compression mode is selected.

Figure 9:
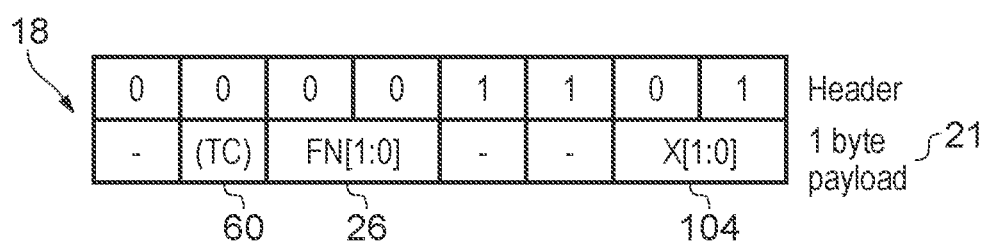
FIG. 9 shows an example of a compression mode in which the exception number is omitted when it is the same as the exception number of a previous exception trace packet.
Figure 9:
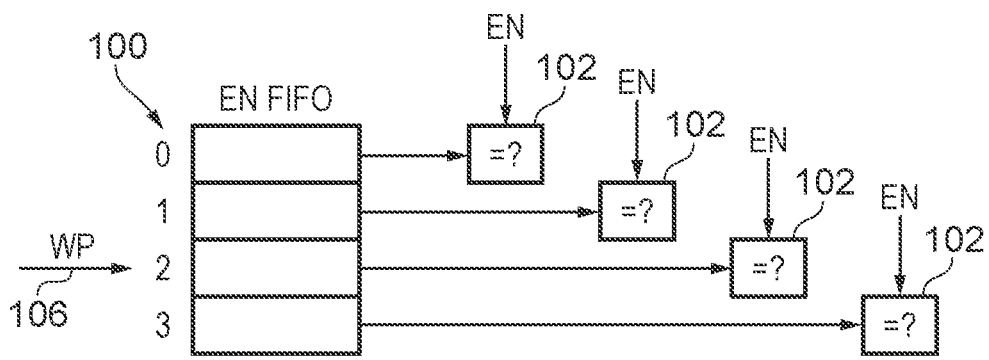

Another example for implementing a compression mode is shown in FIG. 9. The trace module 6 could maintain a first-in-first-out (FIFO) structure 100, or a circular buffer, for storing a certain number of most recently encountered exception numbers. Each time a new exception handling event is detected, a series of comparators 102 compare the new exception number EN against each previous exception number stored in the FIFO 100. If any of the previous exception numbers match the new exception number EN, the exception number is omitted from the next trace packet 18, and an identifier 104 is included in the payload 21 of the trace packet 18 to identify which of the entries of the FIFO 100 contained the matching exception number. For example, FIG. 9 shows an example where the FIFO 100 comprises 4 entries and a 2-bit identifier field X[1:0] 104 is encoded in bits [1:0] of the 1-byte payload. It will be appreciated that there could be other ways of encoding the identifier of which previous exception number matched against the new exception number. Having compared the previous exception numbers against the current exception number, the oldest exception number in the FIFO 100 is then overwritten with the exception number of the new exception handling event. A write pointer 106 may track the location at which the next exception number should be written and may be incremented each time a new exception number is written. When the write pointer 106 reaches the end of the buffer, the next increment causes it to jump back to the start, so that the write pointer 106 circles round and round the buffer. Hence, the FIFO 100 is continually updated to record the most recent exception numbers. The size of the FIFO 100 can be selected depending on implementation requirements to trade off the amount of compression achieved against the energy or circuit area overhead of maintaining a larger buffer.

Again, the trace analyser 14 may maintain a similar FIFO data structure (either using a hardware buffer as in FIG. 9 or by using software to determine a corresponding FIFO array of exception number values). When the trace analyser 14 receives a packet without an exception number, it can use the identifier field 104 to identify which of the previous exception numbers is associated with the current exception handling event.

Hence, the compression mode allows the total amount of exception trace information to be reduced by avoiding repeating the same exception number in multiple packets of the trace stream. The configuration register 16 can be used to select whether the compression mode is active or not.

A number of different techniques for reducing the amount of trace have been described above. Any one or more of these techniques can be applied to a given implementation. For example in some systems it may be desirable to implement filtering of trace packets based on the type of exception handling event (entry, exit or return) but not provide any of the other exception trace reduction techniques. Other systems may implement other subsets of the techniques discussed above depending on the amount of configuration control space available in the configuration register 16 and the relative complexity of implementing this control and hardware when compared to the likelihood that users are expected to use the corresponding functionality. Hence, it is not essential to implement all of the techniques discussed above in a given system.

Figure 10:
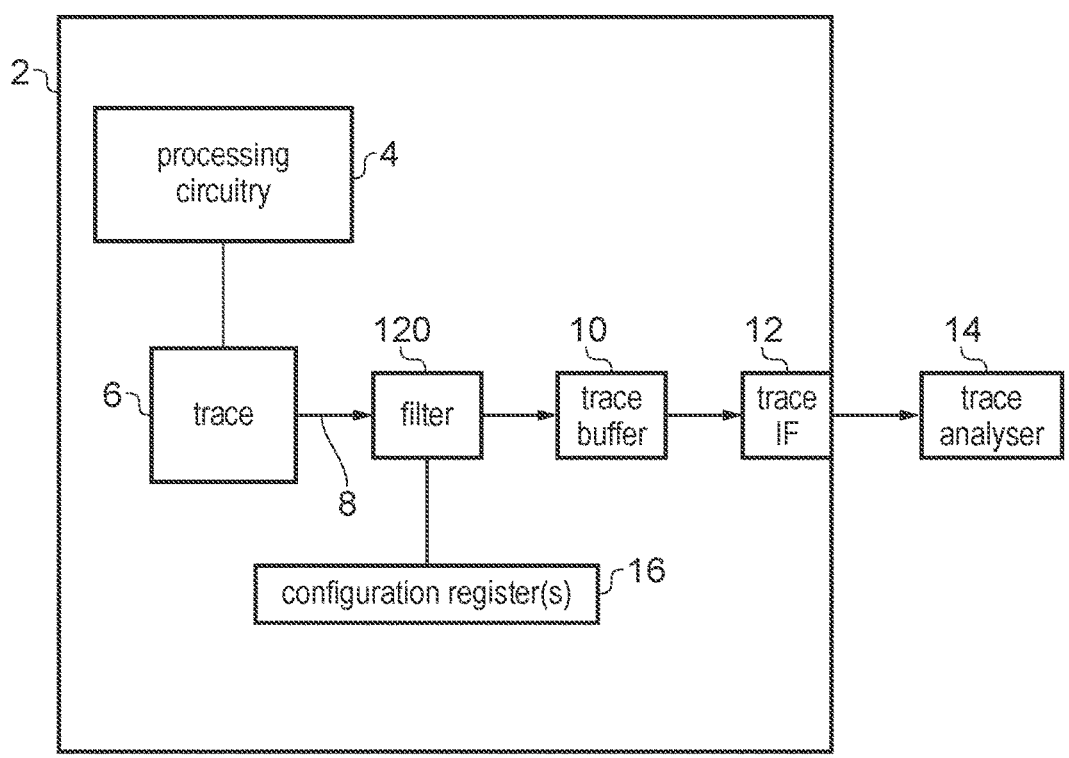
FIG. 10 shows another example of a data processing apparatus comprising trace circuitry.

FIG. 10 shows another example of a data processing apparatus 2. The elements that are the same as in FIG. 1 are shown with the same reference numerals. In the example of FIG. 10 the trace module 6 does not consider the exception trace configuration information of the configuration register 16 but simply outputs an initial trace stream 8 which by default comprises the full exception trace information. A downstream trace filter 120 is provided which, in dependence on the exception trace configuration information in configuration register 16, selectively discards some of the trace packets received from the trace module 6 or modifies what information is included in the trace packets, using any of the techniques shown above. Hence, in some cases the trace circuitry 120 which filters, modifies or compresses the exception trace information in dependence on the configuration information may not actually monitor the processing circuitry 4 itself, but could simply act on a trace stream generated by a separate trace module 6.

Figure 11:
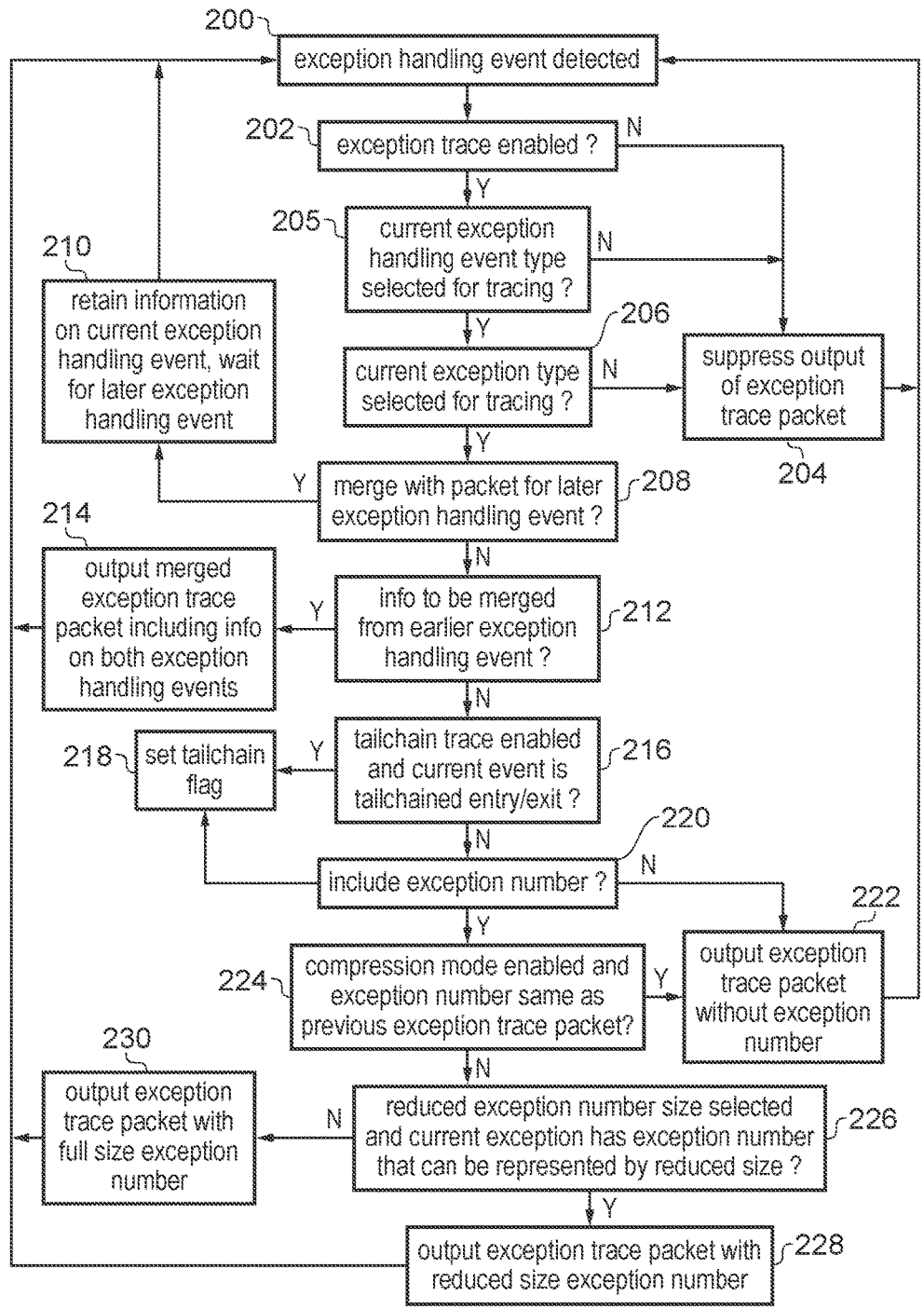
FIG. 11 is a flow diagram showing an example of a method of generating exception trace packets.

FIG. 11 shows a method of tracing exception handling events in a processing system. At step 200 an exception handling event is detected by the trace circuitry 6, 120. In the case of trace module 6 this could be by direct monitoring of the processing circuitry 4, while for a trace filter 120 the exception handling event may be detected when a trace packet relating to a given exception handling event is received in the initial trace stream 8 from the trace module 6. The exception handling event could be any event relating to the handling of an exception by the processing circuitry 4, such as the occurrence of the exception itself (e.g. assertion of an exception or interrupt signal), the entry to an exception handling routine, the exit from an exception handling routine, or the return to some previous processing following completion of an exception handling routine.

At step 202, the trace circuitry the trace circuitry 6, 120 determines whether the configuration information in register 16 specifies that exception trace is enabled. If not, then at step 204 the output of an exception trace packet for this event is suppressed and the method returns to step 200 to await another exception handling event. When output of an exception is suppressed then no packet is output.

On the other hand, if exception trace is enabled then at step 205 the trace circuitry 6, 120 determines whether the configuration information in register 16 specifies that the exception handling event of the currently detected type has been selected for tracing. For example, the configuration registers may specify only a subset of the exception handling events (e.g. exit only, or exit and entry) and other types of event may not be traced. If the current exception handling event is not an event of the selected type then again at step 204 output of an exception trace packet is suppressed.

If the current exception handling event is selected for tracing then at step 206 the trace circuitry 6, 120 determines whether the current exception type has been selected for tracing. The configuration register 16 may specify a certain subset of exception types to be traced (e.g. only exception numbers 0 to 15, or only exception number 4). If the current exception is not a selected exception type, then again the output of an exception trace packet is suppressed at step 204. In summary, steps 205 and 206 implement packet filtering where entire packets can be omitted if they do not relate to one of the specified types of exceptions or types of exception handling events. On the other hand, if at step 206 it is determined that the current exception type is selected for tracing then at least some trace information will be output for this exception handling event.

At step 208 the trace circuitry 6, 120 determines, based on the configuration information in register 16, whether to merge the packet for the current exception handling event with a later exception handling event packet. For example, the register 16 may specify whether exception exit and return packets are to be merged as discussed above. If the packets are to be merged, then at step 210 the information (e.g. the exception number) on the current exception handling event is retained in a storage element while waiting for the later exception handling event to be detected, and the method returns to step 200.

Otherwise, the method continues to step 212 where the trace circuitry 6, 120 determines, based on the configuration information, whether merging of trace packets for different exception handling events is enabled, and if so, whether there is any information retained in step 210 from an earlier exception handling event. If merging is enabled and there is earlier information to be included, then at step 214 a merged exception trace packet is output including information on both the earlier and current exception handling events. For example this could be the merged exception exit and return packet shown in FIG. 4 above. The method then returns to step 200 for detecting the next exception handling event.

On the other hand, if merging is not enabled, or there is no information from an earlier event, then at step 216 the trace circuitry 6, 120 determines based on configuration register 16 whether the tailchain flag 60 is enabled, and if so, whether the current exception handling event is a tail chained exception entry or exit event. A tail chained exception exit or entry occurs when the processing circuitry 4 completes an exception handler for a first exception and starts an exception handler for a second exception before restoring any state associated with processing being performed before the first exception. If the tailchain flag 60 is enabled and the current event is a tailchained exception entry or exit, then at step 218 the tail chain flag is set for the next packet to be output. Otherwise, step 218 is omitted.

At step 220 the trace circuitry 6, 120 determines based on the configuration register 16 whether to include the exception number of the current exception in the exception trace packet. If not, then at step 222 an exception trace packet is output without an exception number 22. The method then returns back to step 200.

If the exception number is to be included then at step 224 the trace circuitry 6, 120 determines from configuration register 16 whether the compression mode is enabled, and if so whether the exception number for the current exception is the same as the exception number for a previous exception trace packet. The previous exception trace packet could be the immediately preceding exception trace packet, or could be a previous exception trace packet whose exception number is recorded in a storage structure such as a stack or FIFO buffer as in the examples discussed above. If the current exception number is the same as the exception number of the previous exception trace packet and the compression mode is enabled, then at step 222 again an exception trace packet is output without any exception number. In the case where the FIFO buffer 100 is used to record a number of earlier exception numbers, the exception trace packet output at step 222 may also include the identifier 104 of which previous exception number matched the current exception number.

If compression mode is not enabled, or the current exception number does not match any previous exception number, then at step 226 the trace circuitry 6, 120 determines whether the configuration register 16 specifies that a reduced size exception number is to be used, and if so, whether the current exception has an exception number that can be represented by that reduced size field. If a reduced size field is enabled by configuration register 16 and the smaller field can accommodate the current exception number, then at step 228 an exception trace packet is output with the reduced exception number field 90 as in the example of FIG. 8 above. If either the configuration information does not permit reduced size exception number fields, or the current exception has an exception number which is too large to be represented by the reduced field, then at step 230 of exception trace packet is output with the full size exception number field (e.g. as in FIG. 2). In all cases the method then returns to step 200 to await the next exception handling event.

While steps 208 and 210 show an example where information is retained while waiting for a later exception handling event so that it can be merged with the packet for that event, in some cases the retained information may be output earlier even if the later exception handling event has not occurred yet. For example, although it may be preferred to merge the packets for two exception handling events, before the second exception handling event occurs, some other event may occur that may make it unsuitable to wait for the second exception handling event. For example, if tracing is to be disabled before the second exception handling event occurs, it may be best to output the retained information on the first exception handling event so that the activity up to the point that tracing was disabled can be retained. Similarly, to prevent the information on the first exception handling event being retained indefinitely while waiting for a second exception handling event which may never happen, a timeout may be imposed so that if the second exception handling event does not occur within a given time period of the first exception handling event then the information relating to the first exception handling event is output singly. Also, in some cases merging may only be supported for some sequences of exception handling events, and so after retaining information on a first exception handling event in case a second exception handling event is of a type for which merging is supported, if the next exception handling event is then not of the supported type, then the information on the first exception handling event can be output as a standalone trace packet without waiting for any further exception handling event.

FIG. 11 shows a combination of all the trace filtering and compression techniques discussed above but it will be appreciated that not some could be omitted and any subset of these techniques could be used in a given implementation. For example:

if filtering based on exception handling event type is not supported, the YES branch is always taken following step 205;

if filtering based on exception type is not supported, the YES branch is always taken following step 206;

if merging of packets is not supported, the NO branch is always taken following steps 208 and 212;

if the tailchain flag is not supported, the NO branch is always taken following step 216;

if omission of the exception number is not supported, the YES branch is always taken following step 220;

if a compression mode is not supported, the NO branch is always taken following step 224; and if a reduced exception number field is not supported, the NO branch is always taken following step 226.

It will be appreciated that the packet sizes and formats shown above are just an example and there may be many ways in which similar information can be encoded in a trace stream. In general, the exception trace configuration information may control how much exception trace data is generated when exception tracing is enabled.

While the examples discussed above include a configuration to selectively enable or disable tracing of the exception handling events altogether, other systems may permanently enable exception tracing. In this case, exception tracing may always be considered enabled but nevertheless the amount of exception trace data generated may be varied depending on the configuration information set in the configuration storage element 16.

While FIG. 1 above shows an example where the configuration information is stored in a configuration register 16, in general the exception trace configuration information could be implemented in a variety of ways. For example, this information could in some cases be stored off-chip or within general purpose registers of the processing circuitry 4 rather than in dedicated configuration registers 16. In some cases at least some of the configuration information could be hardwired during the manufacture or implementation of the apparatus 2 so that it is not possible to program the configuration information once deployed (nevertheless, providing a trace architecture with the option to select different hardwired configurations during manufacture may still be useful).

While FIG. 1 shows an example including both a trace buffer 10 and a trace interface 12, other examples may omit one or other of these. For example the trace data could be output to a detachable storage device such as a memory card within the processing apparatus 2, and then the memory card could be removed to transfer the data into the trace analyser 14 rather than being streamed over the interface 12. Also the trace buffer 10 could be omitted and the generated trace stream 8 could simply be output over the interface 12 on the fly. However, including the buffer 10 helps to decouple the generation of the trace stream from the output of the interface so that even if the trace interface 12 has a bandwidth smaller than the rate at which the trace stream 8 is being generated then some of the information can be saved in a trace buffer to avoid loss of information.

While FIG. 1 shows an example where the trace module 6 is included in the same circuitry as the processing circuit 4 it is monitoring, in other cases it may be possible to implement the trace circuitry as an external trace module 6 which receives information from the apparatus 2 concerning processing activity of the processing circuitry 4 and generates a stream of trace packets indicating various aspects of the processing activity. However, by including the trace module 6 on-chip it is possible to probe more detailed aspects of the processing activity.

As shown in FIG. 1, the trace analyser 14 comprises an interface 300 to receive the trace stream for the processing apparatus 2 and analysis circuitry 302 for decoding and analysing the received trace stream. In some cases, the trace analyser 14 may be implemented in dedicated hardware. The hardware could be an external device as shown in FIG. 1. Alternatively, the target data processing apparatus 2 whose operation is being traced may include on-board trace analysing hardware 14 for analysing its own trace data and possibly making adjustments to the operation of the processing circuitry 4 based on the analysis of the trace data. For example, the hardware could change the mode of operation of the processing circuitry 4 or recompile software executing on the processing circuitry 4 based on the results of the trace analysis. Alternatively, the trace analyser 14 may comprise a general purpose computer in which the analysis circuitry 302 comprises a processor executing software for controlling the processor to analyse the trace stream.

Figure 12:
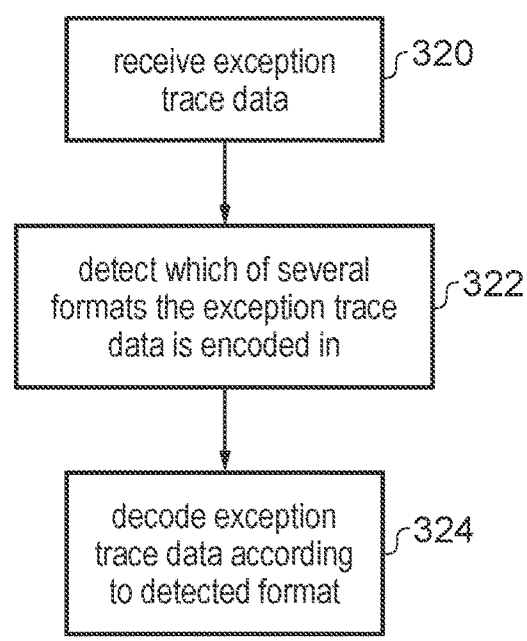
FIG. 12 is a flow diagram showing an example of a method of decoding exception trace data.

FIG. 12 shows a method performed by the trace analyser 14 to analyse the trace data output from the processing apparatus 2. At step 320, exception trace data is received from the processing apparatus 2 over the interface 300. At step 322, the analysis circuitry 302 detects which of several available encoding formats is a current encoding format used to encode the received exception trace data. For example, the analysis circuitry 302 may read the packet header 20 of each exception trace packet to determine the format of that packet. For example, based on the header 20, the analysis circuitry 302 may determine whether the exception number 22 of the exception that occurred is include at all, or whether the exception number is a full-size exception number as shown in FIG. 2 or reduced-size exception number as shown in FIG. 8. The analysis circuitry 302 may also determine based on the header 20 whether the packet includes exception numbers for a single exception handling event (as in FIG. 2) or multiple exception handling events (as in FIG. 4).

At step 324, the analysis circuitry 302 decodes the exception trace data according to the detected format. For example, the analysis circuitry 302 reads the exception number 22 and function number 26 based on the identified format. When a trace compression mode is enabled as discussed for FIG. 9 above, then when a packet is received comprising the identifier field 104, the analyser 14 can reconstruct the exception number 22 based on a previous exception number. Having determined the exception number 22 and function number 26, the analysis circuitry 302 may record this information in a program log tracking execution of the program. For example, the program log may include a count of the number of exceptions of a given type that occurred, which can be updated based on the decoded exception trace information. Hence, the trace analyser 14 can identify based on the trace headers which of several exception trace formats has been used for encoding, and decode the exception-related information accordingly.

In another example, an apparatus may comprise:
means for outputting exception trace data indicative of exception handling events detected during monitoring of processing activity of processing circuitry; and
means for maintaining exception trace configuration data for controlling the output of the exception trace data by the means for outputting; wherein:
when output of the exception trace data is enabled, the means for outputting is configured to select, in dependence on the exception trace configuration data, how much of the exception trace data to output.

In another example, an apparatus may comprise:
means for receiving exception trace data indicative of exception handling events detected during monitoring of processing activity of processing circuitry; and
means for detecting from the exception trace data which of a plurality of encoding formats is a current encoding format in which the exception trace data is encoded, and for decoding the exception trace data according to said current encoding format.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. An apparatus comprising:
trace circuitry to output exception trace data indicative of exception handling events detected during monitoring of processing activity of processing circuitry, the trace circuitry comprising an on-chip trace module to detect signals on internal buses or wires within the processing circuitry to monitor the activity of the processing circuitry; and
a configuration element to maintain exception trace configuration data for controlling the output of the exception trace data by the trace circuitry; wherein:
when output of the exception trace data is enabled, the trace circuitry is configured to select, in dependence on the exception trace configuration data, how much of the exception trace data to output; and
the exception trace data comprises one or more exception trace packets; and
the trace circuitry is configured to select, in a case where an exception trace packet is output, whether to include an exception identifier in the exception trace packet, the exception identifier identifying an exception type for which an exception handling event occurred, and the trace circuitry is configured to select whether to include the exception identifier in dependence on the exception trace configuration data.

2. The apparatus according to claim 1, wherein the trace circuitry is configured to select, in dependence on the exception trace configuration data, which exception trace packets to output.

3. The apparatus according to claim 1, wherein the exception trace configuration data is indicative of at least one selected type of a plurality of types of exception handling event; and
the trace circuitry is configured to suppress output of exception trace packets for types of exception handling event other than said at least one selected type.

4. The apparatus according to claim 3, wherein the plurality of types of exception handling event comprises at least two of:
an exception entry event comprising the processing circuitry entering an exception handling routine in response to occurrence of an exception;
an exception exit event comprising the processing circuitry exiting the exception handling routine; and
an exception return event comprising the processing circuitry returning to processing performed prior to occurrence of the exception.

5. The apparatus according to claim 1, wherein the trace circuitry is configured to select, in dependence on the exception trace configuration data, whether to output a combined exception trace packet corresponding to two or more types of exception handling event or separate exception trace packets for each of said two or more types of exception handling event.

6. The apparatus according to claim 1, wherein the trace circuitry is configured to output at least one exception trace packet comprising a tailchain identifying value indicative of occurrence of a tailchaining event;
the tailchaining event comprising the processing circuitry, following completion of an exception handling routine for a first exception, entering an exception handling routine for a second exception before restoring state associated with processing performed prior to occurrence of said first exception.

7. The apparatus according to claim 6, wherein the trace circuitry is configured to select, in dependence on the exception trace configuration data, whether to include said tailchain identifying value in said at least one exception trace packet.

8. The apparatus according to claim 1, wherein the exception trace configuration data is indicative of at least one selected exception type; and
the trace circuitry is configured to suppress output of exception trace packets for exception handling events relating to exception types other than said at least one selected exception type.

9. The apparatus according to claim 1, wherein the trace circuitry is configured to select, in dependence on the exception trace configuration data, how much information to output in a given exception trace packet.

10. The apparatus according to claim 1, wherein the trace circuitry is configured to select, in dependence on the exception trace configuration data, how many bits are allocated in at least one exception trace packet for encoding an exception identifier identifying an exception type for which an exception handling event occurred.

11. The apparatus according to claim 1, wherein the trace circuitry has a compression mode in which the trace circuitry is configured to omit an exception identifier from a given exception trace packet when the exception identifier has the same value as an exception identifier of a previous exception trace packet.

12. The apparatus according to claim 11, wherein the previous exception trace packet comprises the exception trace packet output immediately preceding the given exception trace packet.

13. The apparatus according to claim 11, wherein the previous exception trace packet comprises any of a plurality of preceding exception trace packets, wherein the given exception trace packet comprises an indication of which of said plurality of preceding exception trace packets is the previous exception trace packet.

14. The apparatus according to claim 11, wherein the trace circuitry is configured to select whether to operate in the compression mode in dependence on the exception trace configuration data.

15. The apparatus according to claim 1, wherein the trace circuitry is configured to selectively enable or disable the output of the exception trace data in dependence on the exception trace configuration data.

16. The apparatus according to claim 1, wherein said on-chip trace module is configured to monitor the processing activity of the processing circuitry, to generate the output exception trace data and to select how much of the exception trace data to output.

17. The apparatus according to claim 1, wherein the trace circuitry comprises:
a trace filter configured to receive an initial trace stream comprising exception trace data from the on-chip trace module, and to select, in dependence on the exception trace configuration data, how much exception trace data of the initial trace stream to output.

18. The apparatus according to claim 1, wherein the trace circuitry is configured to output a trace stream comprising the exception trace data and at least one other type of trace data.

19. The apparatus according to claim 1, comprising at least one of:
a trace buffer to store the trace data output by the trace circuitry; and
a trace interface to transmit the trace data output by the trace circuitry to an external device.

20. The apparatus according to claim 1, comprising the processing circuitry.

21. A system comprising the apparatus of claim 1, and a trace analysis apparatus comprising:
trace receiving circuitry to receive exception trace data indicative of exception handling events detected during monitoring of processing activity of processing circuitry; and
analysing circuitry to detect from the exception trace data which of a plurality of encoding formats is a current encoding format in which the exception trace data is encoded, and to decode the exception trace data according to said current encoding format.

22. A method for monitoring processing activity of processing circuitry using trace circuitry to output exception trace data indicative of exception handling events detected during monitoring of processing activity of processing circuitry, the trace circuitry comprising an on-chip trace module to detect signals on internal buses or wires within the processing circuitry to monitor the activity of the processing circuitry; the method comprising:
maintaining exception trace configuration data for controlling output of exception trace data indicative of exception handling events detected during monitoring of the processing activity of the processing circuitry; and in dependence on the exception trace configuration data, selecting how much of the exception trace data to output when output of exception trace data is enabled; wherein the exception trace data comprises one or more exception trace packets; and selecting, in a case where an exception trace packet is output, whether to include an exception identifier in the exception trace packet, the exception identifier identifying an exception type for which an exception handling event occurred, where said selecting whether to include the exception identifier is performed in dependence on the exception trace configuration data.

\* \* \* \* \*